(12) United States Patent
Homme (10) Patent No.: US 7,355,802 B2
(45) Date of Patent: Apr. 8, 2008

(54) DRIVING DEVICE, LENS BARREL AND IMAGING APPARATUS

(75) Inventor: Shigeo Homme, Hachioji (JP)

(73) Assignee: Konica Minolta Opto, Inc., Tokyo (JP)

(*) Notice: Subject to any disclaimer, the term of this patent is extended or adjusted under 35 U.S.C. 154(b) by 0 days.

(21) Appl. No.: 11/521,106

(22) Filed: Sep. 14, 2006

(65) Prior Publication Data
US 2007/0064320 A1    Mar. 22, 2007

(30) Foreign Application Priority Data
Sep. 20, 2005   (JP)   ............................. 2005-271738

(51) Int. Cl.
G02B 7/02       (2006.01)
G02B 15/14      (2006.01)
H01L 41/00      (2006.01)

(52) U.S. Cl. ...................... 359/824; 359/814; 359/698; 310/323.01; 310/328

(58) Field of Classification Search ................ 359/814, 359/822, 824, 694–698; 310/300, 311, 317, 310/323.01, 323.04, 323.12, 323.14, 323.17, 310/325, 328, 329; 396/72, 75; 348/341, 348/357; 73/35.11, 579
See application file for complete search history.

(56) References Cited

U.S. PATENT DOCUMENTS

| 5,490,015 | A | * | 2/1996 | Umeyama et al. | ........... 359/824 |
| 5,675,444 | A | * | 10/1997 | Ueyama et al. | ............. 359/824 |
| 6,078,440 | A | * | 6/2000 | Ueyama | ..................... 359/824 |
| 6,215,605 | B1 | * | 4/2001 | Kuwana et al. | ............. 359/824 |
| 6,927,527 | B2 | * | 8/2005 | Nakanishi | ............... 310/323.02 |
| 7,262,926 | B2 | * | 8/2007 | Ohsato | ....................... 359/814 |
| 2003/0107667 | A1 | | 6/2003 | Abe et al. | |

FOREIGN PATENT DOCUMENTS

JP    2001-190081    7/2001
JP    2003-222946    8/2003

* cited by examiner

Primary Examiner—Loha Ben
(74) Attorney, Agent, or Firm—Cohen Pontani Lieberman & Pavane LLP (57) ABSTRACT

A driving device including: a vibrating body composed of a plurality of electric elements which are arranged to intersect in a predetermined angle, to vibrate based on a high frequency signal; a driven member having disk shape to be rotated by vibration of the vibrating body; a male screw member formed to rotate integrally with the driven member; a female screw member to be engaged threadably with the male screw member and to move by rotation of the male screw member; wherein the vibrating body is arranged on the male screw member side of the driven member.

6 Claims, 8 Drawing Sheets

DRIVING DEVICE, LENS BARREL AND IMAGING APPARATUS

This application is based on Japanese Patent Application No. 2005-271738 filed on Sep. 20, 2005, in Japanese Patent Office, the entire content of which is hereby incorporated by reference.

BACKGROUND OF THE INVENTION

The present invention relates to a driving device using a vibrating body and in particular to a driving device suitable for driving lens groups provided in a lens barrel. Cameras having a variable focus length imaging lens (hereinafter called zoom lens) have been marketed. The zoom lens is made to change a focus length by moving a plurality of lens groups configuring an optical system to a desired position along an optical axis, to vary a distance between them.

There are two major methods to move the plurality of the lens groups along the optical axis. A method is that a lens frame is engaged with a straight moving guide and the lens frame moves straight by rotating a cam cylinder. The other method is that a shaft practically parallel to the optical axis is provided as a guide shaft for straight moving, a sleeve where the guide shaft penetrates is formed on the lens frame and the lens frame is slidably moved straight directly by a motor and a lead screw along the guide shaft.

The later method having the lens frame moved directly by the lead screw along the guide shaft can be made with a simple structure, thus, it is used for a lens barrel do not requires a collapsible mechanism. (for example, Patent document 1)

Also, there is known a driving device where alternative current is applied to a piezoelectric element to make a vibrating body vibrated, and a driven member is moved relatively thought a friction by repeating contact and break off alternatively to and from the vibrating body.

As an actuator for such device, there is know an actuator where as a vibrating body, two layer type piezoelectric elements arranged so as to cross displacement directions at a predetermined angle, are used, each element is driven by alternative voltage signal having a predetermined phase difference so that a drive member provided at an intersection of the displacement directions of the elements, moves to draw an elliptical orbit and the drive member rotates the driven member in contact with the drive member in a predetermined direction (for example, Patent document 2.)

Patent Document 1: Japanese Unexamined Patent Application Open to Public Inspection No. 2003-222946 (FIG. 2 to FIG. 6)

Patent Document 2: Japanese Unexamined Patent Application Open to Public Inspection No. 2001-190081

The method in the above Patent Document 1 where the lens frame is moved along the guide shaft directly by the motor and the lead screw, requires the motor and the screw for each lens to be moved, thus at least 2 motors are needed for zooming use and there is a problem that the lens barrel becomes bulky due to a volume of the motor.

Also, the actuator in the above Patent Document 2 can drive the cylindrical-shaped driven body in a high speed without noise, however since the vibrating body is provided on a circumference of the driven body, there is remained a room for further down sizing as the driving device.

SUMMARY OF THE INVENTION

The invention has been achieved in view of the above problems, and an object of the present invention is to obtain a smaller driving device using a vibrating body where two layer type piezoelectric elements are arranged so as to cross the displacement directions at the predetermined angle, instead of conventional motors and lead screws. Further, another object is to obtain a compact lens barrel having the method where the lens frame is moved straight directly by the lead screw.

The above problems are solved by the followings.

(1) A driving device having: a vibrating body arranged so as to cross the displacement direction of the plurality of the piezoelectric element at the predetermined angle each other is vibrated by a high frequency signal; driven member having disk shape to be rotated by the vibration of the vibration body; a male screw member formed to rotate along with the driven member; a female screw threadably engaged with the male screw member moves by rotation of the male screw member; wherein the vibrating body is provided male screw member side of the driven member.

(2) The driving device of (1), wherein a detecting member to detect a rotation angle of the driven member is provided on a driven member surface on which the male screw is formed.

(3) The driving device of (1), wherein a detecting member to detect a rotation angle of the driven member is provided on a side surface of the driven member or on a driven member surface opposite to the surface on which the male screw is formed.

(4) The driving device of (1), wherein two male screw members each having a screw thread in different pitch are provided on both sides of the driven member to rotate along with the driven member (5) A lens barrel having the driving device of any one of (1) to (4).

(6) A imaging apparatus having the lens barrel of (5).

According to the present invention, a more compact driving device can be obtained which uses a vibrating body where two layer type piezoelectric elements are arranged so as to cross displacement directions by a predetermined angle, instead of conventional motors and screws. Also, a compact lens barrel having high resolution and low noise employing a method where a lead screw directly moves a lens frame straight can be obtained.

DETAILED DESCRIPTION OF THE PREFERRED EMBODIMENT

While the present invention is described in details using embodiments, it is to be understood that the present invention is not limited to the embodiments thereof.

Figure 1:
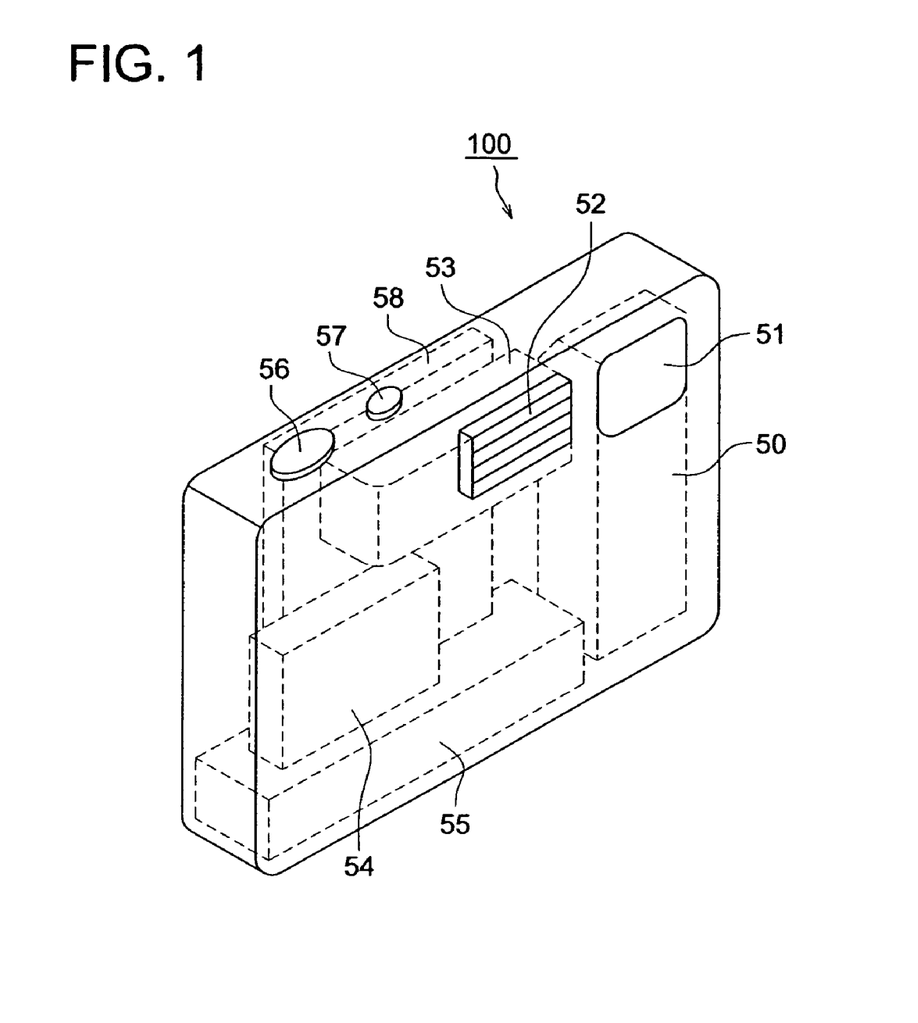
FIG. 1 is an example of internal mechanism of a major component unit of camera 100 which represents an example of an imaging apparatus having lens barrel related to the present embodiment.

FIG. 1 is an example of internal mechanism of a major component unit of camera 100 which represents an example of an imaging apparatus having a lens barrel related to the present embodiment. FIG. 1 is a perspective view of camera 100 observed from a photographic subject side.

As show in the FIG. 1, in camera 100, lens barrel 50 related to the present invention internally, including a variable magnification bending imaging optical system, is arranged on the right side vertically, and opening section 51 is arranged to bring in a beam of a photographic subject. An unillustrated lens barrier to enable an open status where opening section 51 is exposed and a close status where opening section 51 is covered is provided at opening section 51.

Numeral 52 represents a flush light emitting window, numeral 53 represents a flush unit composed of a reflection umbrella arranged behind the flush light emitting window, a xenon tube, main condensers and circuit boards. Numeral 55 represents a battery which can be mounted and dismounted through an unillustrated lid section.

Release button 56 is provided on a top surface of the camera. By its first stage pressing, photographing preliminary operation i.e. focusing and photometry action is activated, then by its second stage pressing, photographing exposure action is executed. Numeral 57 represents a main switch to change the camera from an operational status to a non operational status. When main switch 57 is switched to the operational status, an unillustrated lens barrier is changed to the open status and operation of each section is started. Also, when main switch 57 is switched to non operational status, an unillustrated lens barrier is switched to the close status and operation of each section is terminated.

On the back of the camera, there is provided an image display section 58 composed of LCD or bio EL to display images and character information. Also, there are provided unillustrated a zoom button to zoom up and down, a play button to display the photographed image, a menu button to display various menus on image display section 58, and selection button to select desired functions from the display.

Also, between these main component units, there is provided an unillustrated circuit board to connect each section and to mount various electronic parts, so as to control and drive each main component unit. In the same manner, unillustrated an output/input terminal, a strap anchoring section and a tripod mount are provided.

Figure 2:
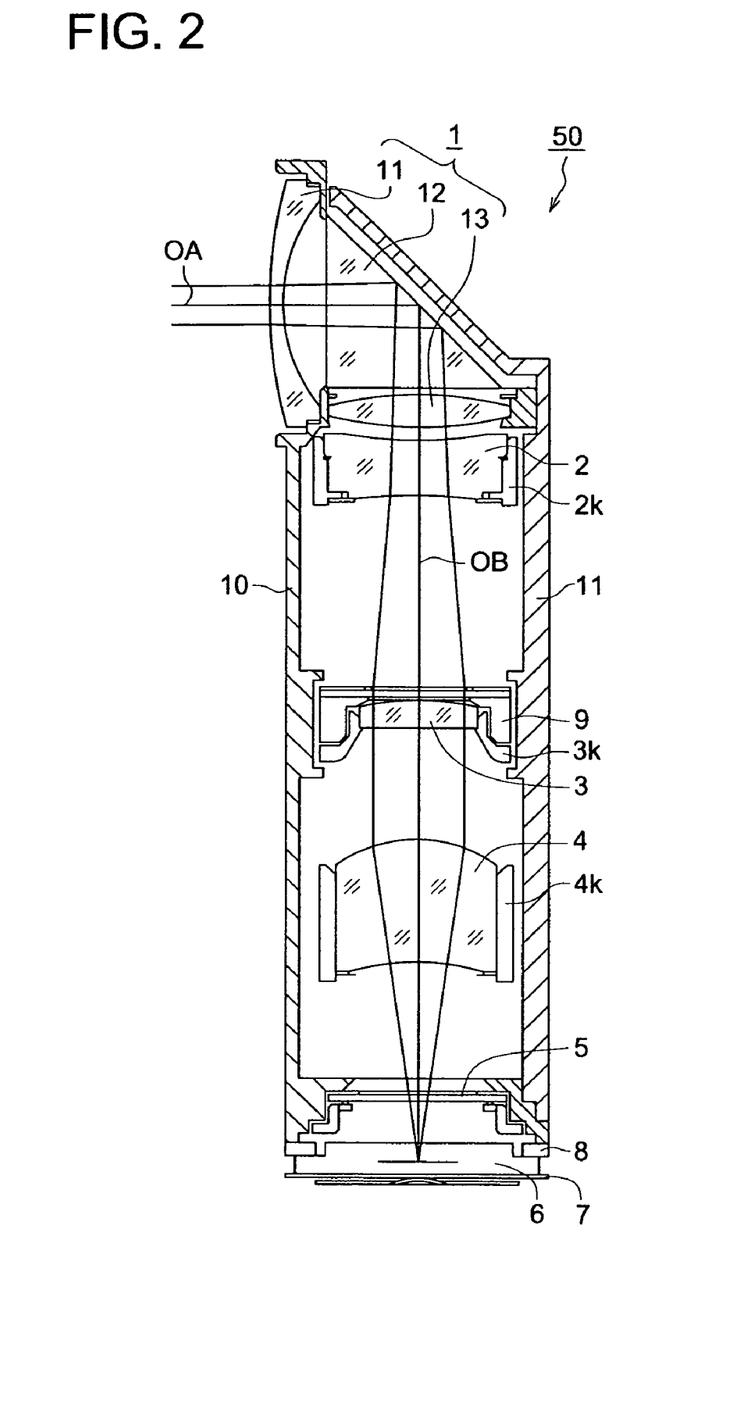
FIG. 2 is cross-sectional view of the variable magnification bending imaging optical system which is internally installed in lens barrel related to the present embodiment.

FIG. 2 is cross-sectional view of the variable magnification bending imaging optical system internally installed in lens barrel 50 related to the present embodiment. FIG. 2 shows a cross section including two optical axes before and after folding in wide-angle status.

As the FIG. 2 shows OA is the optical axis before folding and OB is the optical axis after folding. An exterior of lens barrel 50 is composed of main barrel 10 representing an exterior member and main barrel 11.

Numeral 1 representing a first lens group and first lens group 1 is composed of lens 11 arranged toward a photographic subject having OA as an optical axis, prism 12 representing a reflection member to fold optical axis OA by 90 degrees, and lens 13 aligned with an optical axis which is optical axis OB bent by prism 12.

Numeral 2 representing a second lens group is built onto second lens group frame 2k. Second lens group 2 moves integrally with second lens group frame 2k when magnification is varied (hereinafter called zooming).

Numeral 3 representing a third lens group is built onto third lens group frame 3k. This third lens group 3 does not move while zooming, since third lens group frame 3k is fixed onto main barrel 10.

Numeral 4 representing a forth lens group is built onto fourth lens group frame 4k. Fourth lens group 4 moves integrally with fourth lens group frame 4k while zooming and while adjusting focus (hereinafter called focusing).

Numeral 5 representing an optical filter in which an infrared ray cutting filter and low pass filter are laminated, is built onto main barrel A10. Numeral 6 represents a photographic element where CCD (charge couple device) type image sensor or CMOS (complementary metal-oxide semiconductor) image sensor is used. Photographic element 6 is built onto mounting member 8 and mounting member 8 is built onto main barrel 10 along with photographic element 6. Numeral 7 represents a flexible printed circuit board which is connected with photographic element 6 and with other circuits in the camera. A shutter unit represented by numeral 9 is fixed onto main barrel 10 in the same manner as third lens group frame 3k.

Second lens group 2 and fourth lens group 4 move from a wide angle status position shown by the figure in a direction coming close to third lens group 3 by an amount respectively predetermined so as to carryout zooming.

Figure 3:
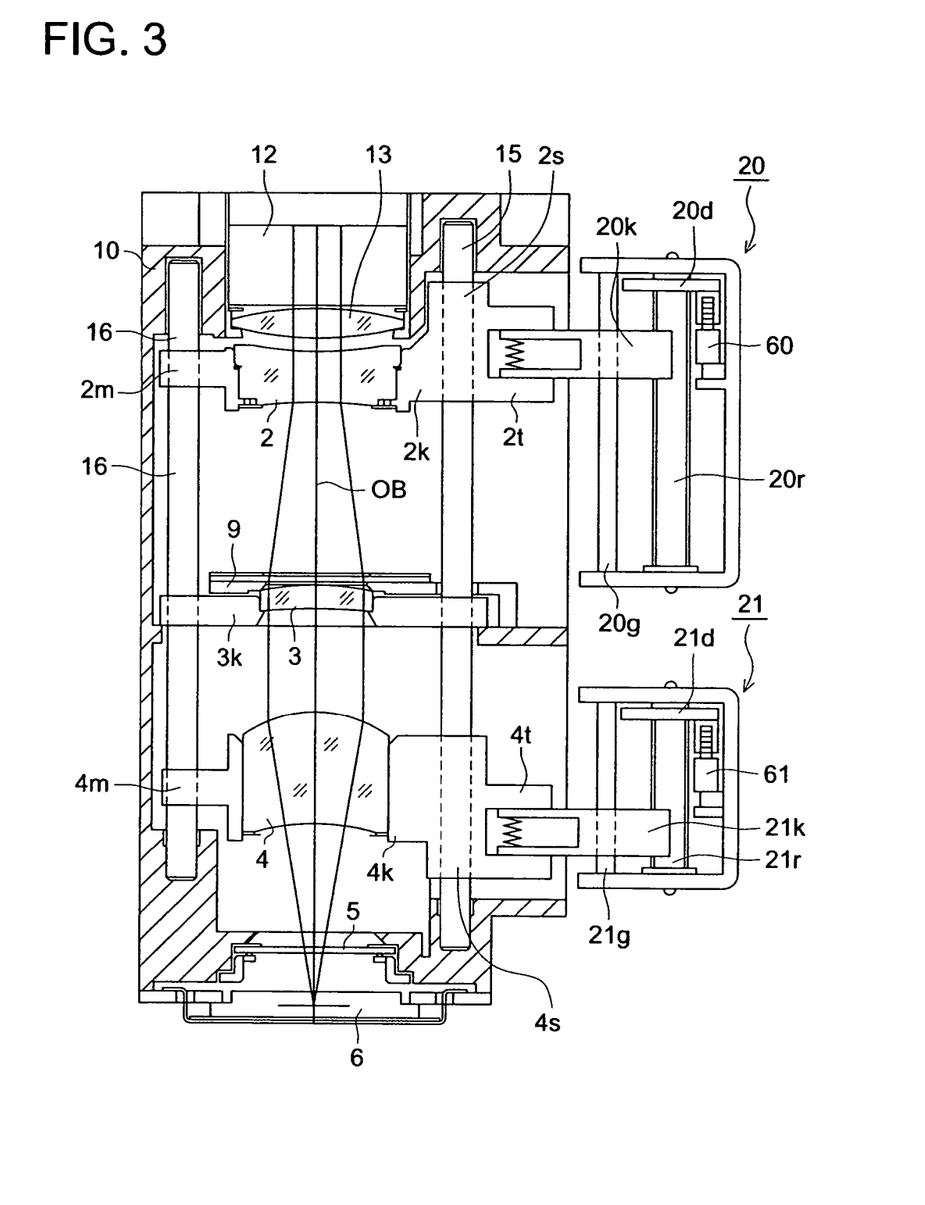
FIG. 3 is a view showing a frame format of a moving mechanism of second lens group 2 and fourth lens group 4, and a schematic structure of inside of the lens barrel.

FIG. 3 is a schematic view showing a moving mechanism of second lens group 2 and fourth lens group 4, and an outline structure of inside of the lens barrel. The figure shows that second lens group 2 and fourth lens group 4 are in wide angle position. In the following figures, for explanation, the same functional members are represented by the same symbols to avoid duplication of explanation. Meanwhile, to make explanation comprehensive, the driving mechanism related to the present embodiment is move outside the lens barrel and described in a schematic diagram.

As shown in the aforesaid figure, there is provide guide shaft 15 which penetrates sleeve 2s integrally formed on second lens group frame 2k and sleeve 4s integrally formed on fourth lens group frame 4k. Further, there is provided guide shaft 16 which slidably engaged with rotation preventing section 2m integrally formed with second lens group frame 2k and rotation preventing section 4m integrally formed with forth lens group frame 4k. Thereby, second lens group frame 2k and fourth lens group frame 4k can slides along guide shaft 16 and 15 in a direction of optical axis OB.

Driving devices 20 and 21 related to the present embodiment are composed of vibrating bodies 60 and 61 of a vibration actuator, disk-shaped driven members 20d and 21d rotated by the vibrating body, lead screws 20r and 21r representing male screw members formed so as to integrally rotate with these driven members 20d and 21d, and female screw member 20k and 21k threadably engaged with the lead screws to move in accordance with rotation of the lead screws.

Second lens group frame 2k has crevice-shaped projecting section 2t formed on sleeve 2s and this projecting section 2t is engaged with female screw section 20k which is moved by rotation of lead screw 20r of drive device 20. Thereby, by rotation of lead screw 20r representing the male screw member of drive device 20, second lens group frame 2k engaged with female screw member 20k slides and moves along guide shafts 15 and 16 in the direction of optical axis OB. Meanwhile, Symbol 20g represents a rotation preventing member for female screw member 20k.

In the same manner, fourth lens group frame 4k has crevice-shaped projecting section 4t formed on sleeve 4s and this projecting section 4t is engaged with female screw section 21k which is moved by rotation of lead screw 21r of drive device 21. Thereby, by rotation of lead screw 21r representing the male screw member of drive device 21, fourth lens group frame 4k engaged with female screw member 21k slides and moves along guide shafts 15 and 16 in the direction of optical axis OB. Meanwhile, Symbol 21g represents a rotation preventing member for female screw member 21k.

Therefore, by rotating lead screws 20r and 21r of driving device 20, second lens group 2 and fourth lens group 4 moves form the wide angle status position shown by the figure in a direction toward third lens group 3 by an amount respectively predetermined so as to execute zooming. Further, fourth lens group 4 further moves from the position moved by zooming to execute focusing.

Meanwhile, unillustrated a position sensor to detect existence of second lens group 2 and a position sensor to detect existence of fourth lens group 4 are provided. For the position sensor, for example photoelectric interrupter is used. The position sensor judges whether intercepting sections each formed on second lens group frame 2k and fourth lens group frame 4k locates between a light emitter and a light receiver of the photo interrupter to interrupt the light or it locates a position where the light is not interrupted. Based on a position where an interruption status changes to a non-interruption status and vice versa, directions and amounts of rotation of lead screw 20r of driving device 20 and lead screw 21r of driving device 21 are controlled so that position control of lens groups is carried out.

First, vibrating bodies 60 and 61 of the vibrating actuator used for driving device 20 and 21 related to the present embodiment is explained as follow. Since vibrating bodies 60 and 61 have the same structure, vibrating body 60 is used for explanation.

Figure 4:
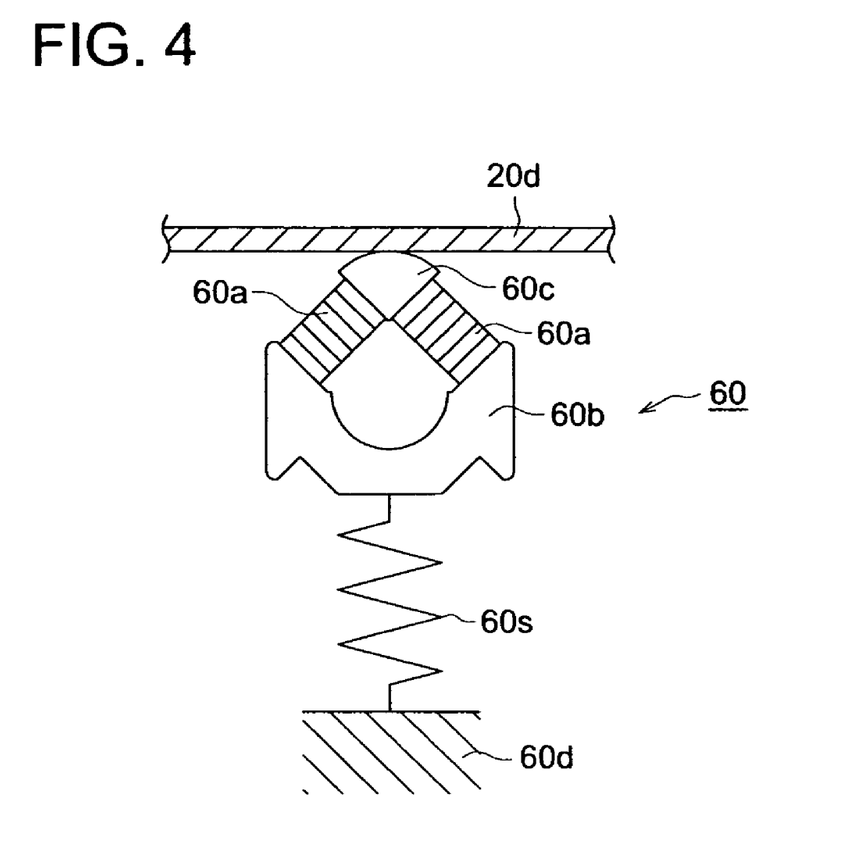
FIG. 4 is a front view schematically showing a structure of a vibrating body.

FIG. 4 is front view schematically showing a structure of vibrating body 60.

As shown in FIG. 4, the vibrating actuator is provided with vibrating body 60 representing driving source, driven member 20d representing driven body driven by vibrating body 60, pressure member 60s composed of an elastic member and mounting seat 60d.

Vibrating body 60, is composed of two piezoelectric elements 60a, chip member 60c and base member 60b, and vibrates in accordance with applying of high frequency voltage (high frequency signal).

As shown in the figure, two piezoelectric elements 60a are arranged to intersect practically perpendicular each other and an intersection side end is bonded with chip member 60c.

Chip member 60c is preferred to be formed with a material (for example metal material such as stainless steel) having a stable and high friction coefficient as well as a high abrasion resistance. Also, piezoelectric element 60a is bonded with chip member 60c and base member 60b by an adhesive. As the adhesive, an epoxy based adhesive having high adhesion strength is preferred.

Two piezoelectric element 60a are layer type piezoelectric elements and they have a structure where a plurality of thin ceramic substrates having piezoelectric characteristic and electrodes are alternatively laminated. Piezoelectric element 60a is a displacement element which expands and contracts in a direction of lamination according to a voltage applied. Specifically, it expands when a predetermined polarity of voltage is applied and contracts when a negative polarity of voltage is applied. Thus, if an alternative voltage is applied, it repeats expansion and contraction in accordance with a frequency of the alternative voltage. Therefore, vibrating body 60 can be vibrated by applying alternative voltages having a phase difference to two piezoelectric elements.

Figure 5:
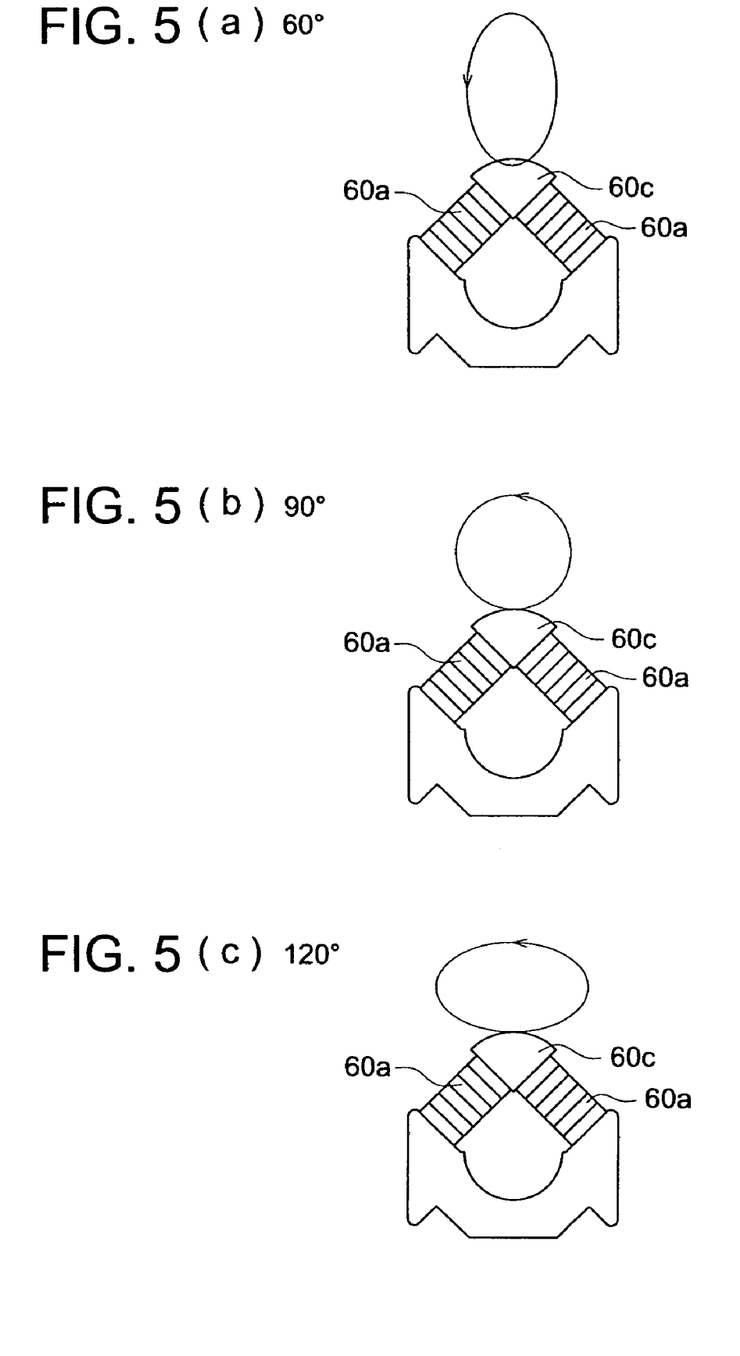
FIG. 5 is a diagram showing driving operation of vibrating body.

FIG. 5 is a figure showing driving operation of vibrating body 60. As shown in the figure, chip member 60c of vibrating body 60 can make orbital movement by driving two piezoelectric element 60a of vibrating body 60 with alternative voltage having phase difference.

FIG. 5(a) shows a movement locus of chip member 60c when the phase difference is 60°, FIG. 5(b) shows a movement locus of chip member 60c when the phase difference is 90° and FIG. 5(c) shows a movement locus of chip member 60c when the phase difference is 120°. As show in these figures, when the phase difference is set at 90°, chip member 60c makes a circular movement and movement locus can be established in any desired form by changing the phase difference.

The vibration actuator of the present embodiment moves driven member 20d by using the movement locus of chip member 60c of vibrating body 60.

FIG. 4 shows that driven member 20d is in contact with chip member 60c of vibrating body 60 and a drive force of vibrating body 60 can be transferred directly. Specifically, while driven member 20d repeats contact (collision) and breakaway, it is driven by the friction between chip member 60c. In other words, by repeating micro-movement involving frictional contact between chip member 60c of vibrating member 60 and a surface of driven member 20d, driven member 20d is driven.

Driven member 20d is formed by metal material and ceramic. Also, it is preferred that surface hardening treatment is applied to a surface of the metal material so as to prevent wearing due to contact with chip member 60c. For example, quench hardening and intruding are preferred for steel based material such as stainless steel, and alumite treatment or coating on the metal surface with an abrasion resist material such as ceramics are preferred for aluminum. Further, if the driven member 20d is formed by ceramics such as alumina ceramic or zirconia ceramic, besides light weight, high rigidity and high abrasion resistance can be obtained.

Vibrating body 60 is provided with pressure member 60s on the opposite side of driven member 20d. Pressure member 60s is composed of, for example, an elastic material such as a leaf spring and a coil spring, and an end of pressure member 60s is fixed onto base member 60b and the other end is fixed onto pedestal 60d. By bias force of pressure member 60s, chip member 60c of vibrating body 60 is lightly pressed against driven member 20b. Meanwhile, bias force of pressure member 60s is relatively small and is adjusted in a level wherein expansion and contraction action of pressure member 60s cannot follow vibrating frequency of vibrating body 60 which vibrates in very high frequency.

The forgoing is outline of operation and structure of the vibrating body of the driving device of the present embodiment.

The driving device of the present invention is explained as follow. Meanwhile, since driving devices 20 and 21 have the same structure, driving device 20 is used for explanation.

Figure 6:
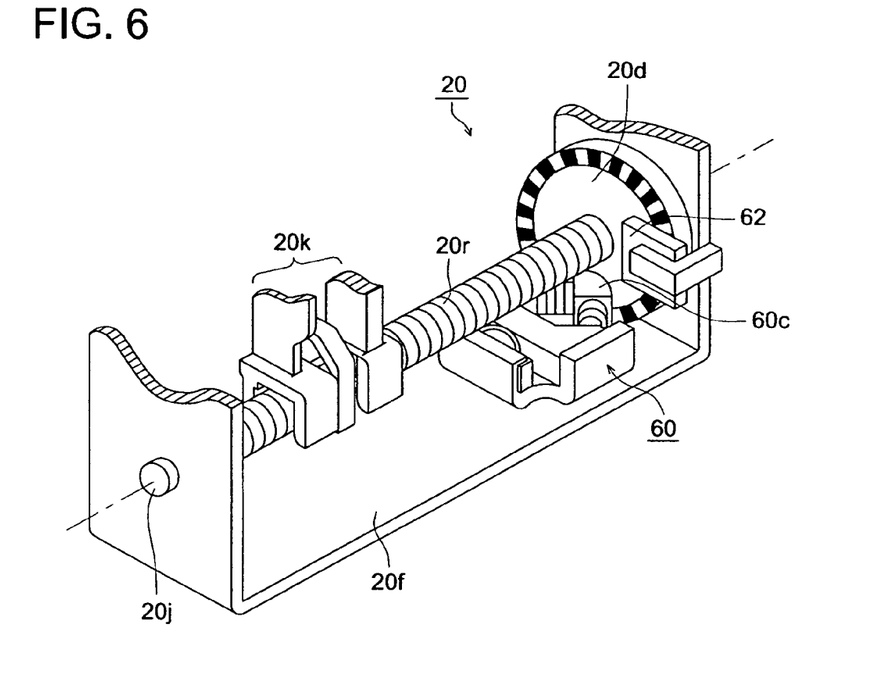
FIG. 6 is a perspective view showing an example of driving device.

FIG. 6 is a perspective view showing an example of driving device 20.

As FIG. 5 shows, disk-shaped driven member 20d and lead screw 20r representing a male screw member which rotates integrally with driven member 20d are supported rotatably at their rotation shaft 20j by frame 20f. Further, vibrating body 60 is provided at lead screw 20r (representing a male screw member) side of driven member 20d and pedestal 60d is fixed onto frame 20f. Meanwhile, driven member 20d and lead screw 20r can be formed as an unit or can be formed integrally by connecting each other.

By applying alternative voltage having phase difference to two piezoelectric elements of vibrating body 60, chip member 60c of vibrating body 60 repeats contact (collision) and breakaway with a lead screw side surface of driven member 20d, thus driven member 20d rotates with rotation shaft 20j as a rotation axis. Female screw member 20k is moved by lead screw 20r which integrally rotates along with driven member 20d, and moves second lens group frame k2 in the direction of optical axis OB.

Further, as the figure shows, high reflectance portions and having low reflectance portions are formed alternatively in a predetermined angle pitch on a circumference of the lead screw 20r side surface of driven member 20d. Photo reflector 62 is provided at lead screw 20r side of driven member 20, opposing the circumference of thereof. With this photo reflector 62, rotation angle of driven member 20d is detected.

Meanwhile, unillustrated electrical connections are provided between the vibrating body and a rotation detecting member to transmit and receive predetermined signals, and to supply electric power.

Also, forming of the high reflectance portions and the low reflectance portions in the predetermined angle pitch can be achieved by printing directly on driven member 20d or by affixing a sheet member having printed on driven member 20d with adhesive. Also, instead of printing, projection sections and depressing sections may be formed on a detecting surface of photo detector 62 in a predetermined angle pitch so as to change an amount of light received by photo reflector 62.

Also, by forming projections on the circumference of lead screw 20r side surface in a shape of crown gear in a predetermined angle pitch, the projections pass through a space between a light emitter and a light receiver of a photo interrupter so as to detect the rotation angle.

Therefore, second lens group frame 2k shown in FIG. 3, is moved in the optical axis OB direction by rotating driven member 20d through vibrating body 60. Based on the changing position of unillustrated position sensor, from the interrupting status to the non-interrupting status and vice versa, second lens group frame 2k can be moved and stopped at a desired position by the rotation direction of driven member 20d according to a drive direction of the vibrating body and by the rotation angle of driven member 20d detected through photo detector 62.

Figure 7A:
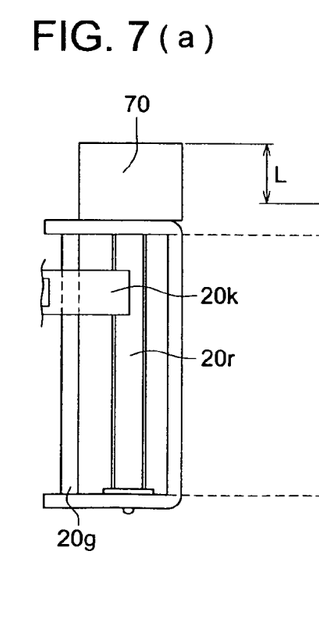
FIG. 7 is a comparison diagram of a driving device of the present embodiment versus a conventional driving device.
Figure 7B:
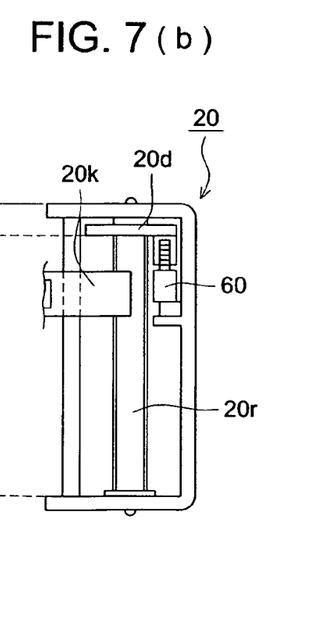

FIG. 7 is a comparison diagram of driving device 20 of the present embodiment versus a conventional driving device using stepping motors and lead screws. FIG. 7(a) shows driving device 20 shown in FIG. 3 and FIG. 7(b) is a driving device using conventional stepping motor 70 and lead screw 20. Also FIG. 7(a) and FIG. 7(b) show appearances of each driving device where movable ranges (shown by broken lines) of lead screw 20r representing male screw member is equalized.

As shown in FIG. 7(a) and FIG. 7(b), in case the movable range of lead screw 20r is equal i.e. a total stroke of female screw section 20k is the same, driving device 20 of the present embodiment shown in FIG. 7(a) can save a most of space (shown by L in the figure) where stepping motor 70 shown in FIG. 7(b) occupies and then the driving device can be down sized.

Figure 8:
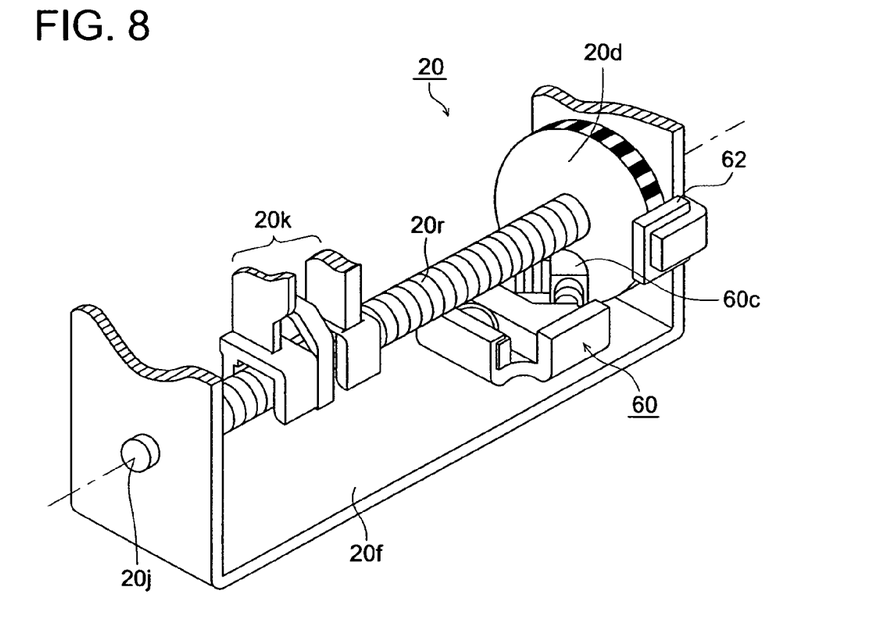
FIG. 8 is a perspective view showing other example of driving device related to the present embodiment.

FIG. 8 is a perspective view showing an example of driving device 20 related to the present embodiment. concerning driving device 20 shown by FIG. 8, different portions from driving device 20 shown by FIG. 6 are explained.

In driving device 20 shown by FIG. 8, a position of the detecting member to detect rotation angle of driven member 20d is located at the side surface of driven member 20d.

In driving device 20 shown by FIG. 8, the high reflectance portions and the low reflectance portions are formed in the predetermined angle pitch on a cylindrical surface representing a side surface of disk-shaped driven member 20d and photo reflector 62 is arranged opposite to the cylindrical surface.

Meanwhile, by forming projecting section and depressing sections on the cylindrical surface of driven member 20d in the predetermined angle pitch, the projecting sections and the depressing sections pass through the space between the light emitter and the light receiver of the photo interrupter so as to repeat interruption of the light emitter and light receiver by the projecting sections, thus the rotation angle may detected.

Figure 9:
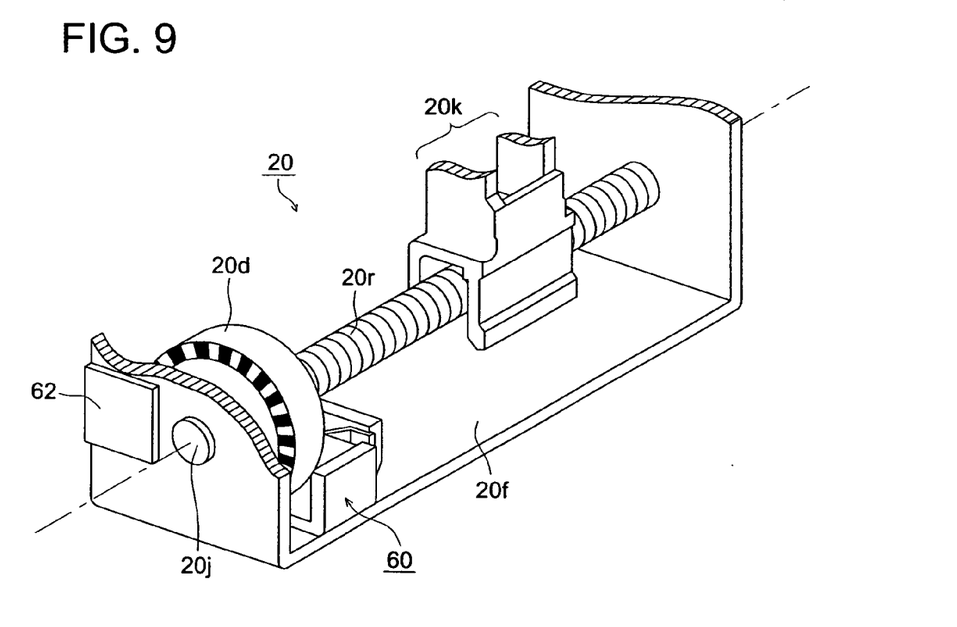
FIG. 9 is also a perspective view showing other example of driving device related to the present embodiment.

FIG. 9 is a perspective view showing other example of driving device 20 of the present embodiment. Regarding driving device 20 shown by FIG. 9, also only different portions from driving device 20 shown by FIG. 6 and FIG. 8 are explained.

In driving device 20 shown by FIG. 9, the high reflectance portions and the low reflectance portions are formed in the predetermined angle pitch on the opposite surface of disk-shaped driven member 20d, to the surface where lead screw 20r is formed. The photo reflector 62 is arranged opposite to this surface.

Figure 10:
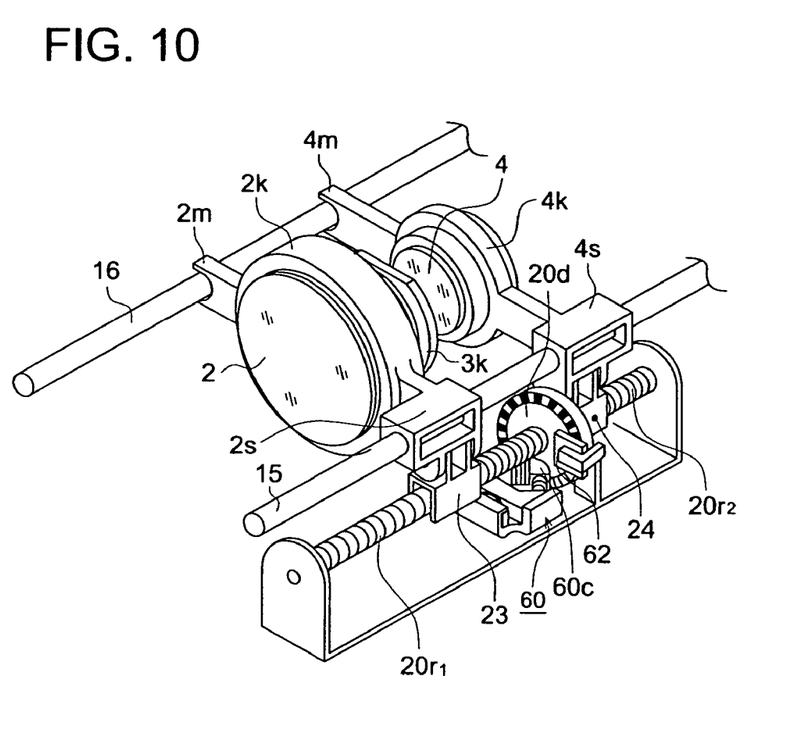
FIG. 10 is a perspective view showing other example of driving device related to the present embodiment.

FIG. 10 is a schematic diagram of another example of driving device 20 assembled with the moving mechanism of second lens group 2 and forth lens mechanism 4, related to the present invention. For the driving device 20 in FIG. 10, only different portions from driving device 20 in FIG. 6 is explained. Also, explanation for the moving mechanism and the structure of lens barrel interior is omitted here, since they are the same as those in FIG. 3.

As FIG. 10 shows, a male screw member is composed of lead screws $20r_1$ and $20r_2$ and penetrates disk-shaped driven member 20d so as to rotates integrally with driven member 20d. The male screw member is rotatably supported by frame 20f. Lead screws $20r_1$ and $20r_2$ are formed respectively on both sides of driven member 20d having driven member 20d in between. Further, vibrating body 60 is provided at lead screw $20r_1$ (representing a male screw member) side of driven member 20d and pedestal 60d is fixed onto frame 20f. Meanwhile, driven member 20d and lead screw $20r_1$ and $20r_2$ can be formed as one unit or can be formed integrally by connecting them each other.

Lead screws $20r_1$ and $20r_2$ each having different pitch of screw threads are formed on both sides of driven member 20d having driven member 20d in between. Female screw members 23 and 24 move in directions of approaching to or receding from each other depending on rotation directions of lead screws $20r_1$ and $20r_2$. Each of female screw members 23 and 24 is engaged with each projecting section 2t and 4t, and moves second lens group frame 2k and fourth lens group frame 4k through sleeves 2s and 4s from a wide-angle range to a telescope range.

As explained in the forgoing, by a structure, wherein the vibrating body is composed of a plurality of the piezoelectric elements which are arranged to intersect at the predetermined angle, vibrates based on high frequency signal, and is provided along the lead screw to rotate disk-shaped driven member, and female screw member is moved through the lead screw, a driving device smaller than the driving device using conventional stepping motors and lead screws can be obtained. Further, by using this driving device for the method wherein the lens frame is moved straight, a smaller lens barrel than conventional one can be obtained.

Meanwhile, in the above explanation, while the lens barrel including bending optical system is used for explanation, the present invention is not limited to the optical system thereof and can also be applied to lens barrels including an ordinary imaging optical system having no reflection surface inside. Also, while zooming is quoted as the example, the driving device related to the present embodiment can be applied for focusing of single focus lens.

Also, detection of rotation angle of the driven member has been explained through the example where detection of the rotation angle of the driven member is achieved by forming the high reflection portions and the low reflection portions in the predetermined angle pitch on the driven member, and by detecting the rotation angle by the photo reflector opposing to the portions thereof, however the present invention is not limited to the example thereof. The rotation angle can also be detected through a computation process of an output signal outputted in accordance with moving of a magnetic thin film resistance element used as the detecting member provided opposite to the driven member where N poles and S poles are formed alternatively in the rotation direction.

What is claimed is:

1. A driving device comprising:
   a vibrating body composed of a plurality of piezoelectric elements which are arranged to intersect at a predetermined angle with each other, to vibrate based on a high frequency signal;
   a disk-shaped driven member to be rotated by vibration of the vibrating body;
   a male screw member formed to rotate integrally with the driven member;
   a female screw member to be engaged threadably with the male screw member and to be moved by rotation of the male screw member;
   wherein the vibrating body is arranged on the male screw member side of the driven member.

2. The driving device of claim 1, wherein a detecting member to detect a rotation angle of the driven member is provided on a driven member surface on which the male screw member is formed.

3. The driving device of claim 1, wherein a detecting member to detect a rotation angle of the driven member is provided on a side surface of the driven member or on a surface opposite to the surface where the male screw member of the driven member is formed.

4. The driving device of claim 1, wherein the male screw member penetrate the driven member so as to rotate integrally with the driven member and has two different screw threads in pitch on both sides of the driven member respectively.

5. A lens barrel, comprising the driving device of claim 1, wherein a lens group is moved by the driving device.

6. An imaging apparatus comprising the lens barrel of claim 5.

* * * * *